United States Patent
Ma et al.

(10) Patent No.: US 11,899,918 B2
(45) Date of Patent: Feb. 13, 2024

(54) METHOD, APPARATUS, ELECTRONIC DEVICE AND STORAGE MEDIUM FOR INVOKING TOUCH SCREEN MAGNIFIER

(71) Applicant: Anhui Hongcheng Opto-Electronics Co., Ltd., Anhui (CN)

(72) Inventors: Lili Ma, Anhui (CN); Junfeng Li, Anhui (CN)

(73) Assignee: Anhui Hongcheng Opto-Electronics Co., Ltd., Bengbu (CN)

( * ) Notice: Subject to any disclaimer, the term of this patent is extended or adjusted under 35 U.S.C. 154(b) by 0 days.

(21) Appl. No.: 18/032,813

(22) PCT Filed: Dec. 29, 2020

(86) PCT No.: PCT/CN2020/140948
§ 371 (c)(1),
(2) Date: Apr. 20, 2023

(87) PCT Pub. No.: WO2022/083003
PCT Pub. Date: Apr. 28, 2022

(65) Prior Publication Data
US 2023/0384923 A1   Nov. 30, 2023

(30) Foreign Application Priority Data
Oct. 21, 2020 (CN) .......................... 202011134935.0

(51) Int. Cl.
*G06F 3/04847* (2022.01)
*G06F 3/0488* (2022.01)

(52) U.S. Cl.
CPC ........ *G06F 3/04847* (2013.01); *G06F 3/0488* (2013.01); *G06F 2203/04805* (2013.01)

(58) Field of Classification Search
CPC ............... G06F 3/0488; G06F 3/04847; G06F 2203/04805
See application file for complete search history.

(56) References Cited

U.S. PATENT DOCUMENTS

| 11,132,433 B1 * | 9/2021 | Rozenbaum ........ G06F 3/04883 |
| 2010/0271318 A1 * | 10/2010 | Li ....................... G06F 3/04883 345/173 |

(Continued)

FOREIGN PATENT DOCUMENTS

| CN | 102854982 A | 1/2013 |
| CN | 103616973 A | 3/2014 |

(Continued)

OTHER PUBLICATIONS

The First Office Action for Chinese Application No. 202011134935.0, dated Aug. 25, 2021, 12 pages.

(Continued)

*Primary Examiner* — Kenneth Bukowski
(74) *Attorney, Agent, or Firm* — East IP P.C.

(57) ABSTRACT

One or more embodiments of the present application provide a method, an apparatus, an electronic device and a storage medium for invoking a touch screen magnifier, including: determining a sliding track in response to a sliding touch instruction by a user on a touch screen; judging whether the sliding track satisfies a recognition condition of a preset pattern; and invoking a magnifier corresponding to the preset pattern on the touch screen under a condition that the sliding track satisfies the recognition condition of the preset pattern.

15 Claims, 8 Drawing Sheets

(56) References Cited

U.S. PATENT DOCUMENTS

| | | | | |
|---|---|---|---|---|
| 2011/0109581 A1* | 5/2011 | Ozawa | ................ | G06F 3/0481 |
| | | | | 345/173 |
| 2012/0174029 A1* | 7/2012 | Bastide | ................ | G06F 3/0488 |
| | | | | 715/800 |
| 2013/0002720 A1* | 1/2013 | Chang | ................ | G06F 3/0488 |
| | | | | 345/660 |
| 2014/0059481 A1* | 2/2014 | Lee | ................ | G06F 3/0485 |
| | | | | 715/784 |
| 2016/0034101 A1* | 2/2016 | Zongmin | ............. | G06F 3/0488 |
| | | | | 345/178 |
| 2019/0087654 A1 | 3/2019 | Xiao et al. | | |
| 2019/0317596 A1 | 10/2019 | Sato | | |

FOREIGN PATENT DOCUMENTS

| | | |
|---|---|---|
| CN | 103702156 A | 4/2014 |
| CN | 104424473 A | 3/2015 |
| CN | 204731396 A | 6/2015 |
| CN | 104850264 A | 8/2015 |
| CN | 106445368 A | 2/2017 |
| CN | 107656788 A | 2/2018 |
| CN | 104951223 B | 10/2018 |
| CN | 111651527 A | 9/2020 |

OTHER PUBLICATIONS

The Second Office Action for Chinese Application No. 202011134935.0, dated Mar. 7, 2022, 14 pages.
The International search report for PCT Application No. PCT/CN2020/140948, dated Jul. 22, 2021, 4 pages.

* cited by examiner

METHOD, APPARATUS, ELECTRONIC DEVICE AND STORAGE MEDIUM FOR INVOKING TOUCH SCREEN MAGNIFIER

CROSS-REFERENCE TO RELATED APPLICATION

This application is a National Stage of International Application No. PCT/CN2020/140948 filed on Dec. 29, 2020, which claims priority to Chinese patent application No. 202011134935.0 entitled "METHOD, APPARATUS, ELECTRONIC DEVICE AND STORAGE MEDIUM FOR INVOKING TOUCH SCREEN MAGNIFIER" and filed on Oct. 21, 2020, both of which are hereby incorporated by reference in their entireties.

TECHNICAL FIELD

One or more embodiments of the present application relate to the technological field of a touch display apparatus, and particularly to a method, an apparatus, an electronic device and a storage medium for invoking a touch screen magnifier.

BACKGROUND

In the related art, in teaching software operating on a touch screen, after a mouse is used to click a magnifier function icon to magnify an image on the touch screen, a magnifier function is invoked to zoom in or zoom out an image on the touch screen as a whole, thereby causing a problem of user's inconvenience in operation.

SUMMARY

In view of this, an object of one or more embodiments of the present application is to provide a method, an apparatus, an electronic device and a storage medium for invoking a touch screen magnifier.

Based on the above object, one or more embodiments of the present application provide a method for invoking a touch screen magnifier, and the method includes:
  determining a sliding track in response to a sliding touch instruction by a user on a touch screen;
  judging whether the sliding track satisfies a recognition condition of a preset pattern; and
  invoking a magnifier corresponding to the preset pattern on the touch screen under a condition that the sliding track satisfies the recognition condition of the preset pattern.

Optionally, judging whether the sliding track satisfies the recognition condition of the preset pattern includes:
  extracting a set of key points according to the sliding track, wherein the set of key points includes at least five key points: a first key point, a second key point, a third key point, a fourth key point and a fifth key point, the first key point is a starting point of the sliding track, and the fifth key point is an end point of the sliding track; and
  it is judged that whether the sliding track satisfies the recognition condition of the preset pattern based on the key points in the set of key points.

Optionally, extracting the set of key points according to the sliding track includes:
  connecting the first key point to the fifth key point to determine a first judgment line segment;
  selecting a point with a maximum vertical distance to the first judgment line segment on the sliding track as the third key point;
  connecting the first key point to the third key point to determine a second judgment line segment;
  connecting the third key point to the fifth key point to determine a third judgment line segment;
  selecting a point with a maximum vertical distance to the second judgment line segment on the sliding track between the first key point and the third key point as the second key point;
  selecting a point with a maximum vertical distance to the third judgment line segment on the sliding track between the third key point and the fifth key point as the fourth key point.

Optionally, the preset pattern includes a first preset pattern, and judging whether the sliding track satisfies the recognition condition of the preset pattern based on the key points in the set of key points includes:
  connecting all of the key points in the set of key points in sequence according to a sequence number from the first key point to the fifth key point to determine a key line segment between two adjacent key points in the set of key points;
  determining an angle between any two adjacent key line segments to obtain several key angles;
  judging whether all of the key angles satisfy a preset angle threshold;
  judging whether a distance between the first key point and the fifth key point is greater than a preset distance threshold under a condition that all of the key angles satisfy the preset angle threshold; and
  determining that the sliding track satisfies the recognition condition of the first preset pattern under a condition that the distance between the first key point and the fifth key point is not greater than the preset distance threshold.

Optionally, the preset pattern further includes a second preset pattern, and after judging whether all of the key angles satisfy the preset angle threshold, the method further includes:
  further judging whether all the key line segments are approximately equal within a preset error range under a condition that at least one of the key angles does not satisfy the preset angle threshold;
  judging whether the distance between the first key point and the fifth key point is greater than the preset distance threshold under a condition that the lengths of all the key line segments are approximately equal within the preset error range; and
  determining that the sliding track satisfies a recognition condition of the second preset pattern under a condition that the distance between the first key point and the fifth key point is not greater than the preset distance threshold;

Optionally, the preset pattern includes a third preset pattern, and after judging whether the lengths of all the key line segments are approximately equal within the preset error range, the method further includes:
  further judging whether at least one of the key angles is within a preset straight angle threshold under a condition that all the key line segments are not approximately equal within the preset error range;
  judging whether the distance between the first key point and the fifth key point is greater than the preset distance threshold under a condition that at least one of the key angles is within the preset straight angle threshold range; and determining that the sliding track satisfies a recognition condition of the third preset pattern under a condition that the distance between the first key point and the fifth key point is not greater than the preset distance threshold.

Optionally, the preset pattern further includes a fourth preset pattern, and after judging whether at least one of the key angles is within a preset straight angle threshold range, the method further includes:

under a condition that none of the key angles does not satisfy the preset straight angle threshold, selecting, on each key track, a point with a maximum vertical distance to the key line segment corresponding to the key track in sequence as an auxiliary point, and the key track refers to a sliding track between two ends of the key line segment;

determining a fitted elliptical track according to the key points and the auxiliary points;

judging whether a sum of distances, each of which is between a respective point on the sliding track and the fitted elliptical track, satisfies a preset fitting threshold;

judging whether the distance between the first key point and the fifth key point is greater than the preset distance threshold under a condition that the sum of the distances satisfies the preset fitting threshold; and determining that the sliding track satisfies a recognition condition of the fourth preset pattern under a condition that the distance between the first key point and the fifth key point is not greater than the preset distance threshold.

Optionally, after invoking the magnifier corresponding to the preset pattern on the touch screen, the method further includes:

gradually reducing a size of a first target image into a first size in response to a first touch instruction by a user, wherein the first touch instruction refers to approaching of at least two fingers of the user in a first operation region, the first operation region refers to a magnified region of the magnifier, and the first target image refers to a target image corresponding to the first operation region;

gradually increasing the size of the first target image into a second size in response to a second touch instruction by the user, and the second touch instruction refers to moving away of at least two fingers of the user from each other in the first operation region.

Based on the same inventive concept, one or more embodiments of the present application further provide an apparatus for invoking a touch screen magnifier, wherein the apparatus includes:

a track determination module configured to determine a sliding track in response to a sliding touch instruction by a user on a touch screen;

a judgment module configured to judge whether the sliding track satisfies a recognition condition of a preset pattern; and an invoking module configured to invoke a magnifier corresponding to the preset pattern on the touch screen under a condition that the sliding track satisfies the recognition condition of the preset pattern.

Based on the same inventive concept, one or more embodiments of the present application further provide an electronic device including a memory, a processor and a computer program stored on the memory and executable on the processor, wherein the processor, when executing the program, implements the above method for invoking the touch screen magnifier.

Based on the same inventive concept, one or more embodiments of the present application provide a non-transitory computer-readable storage medium, wherein the computer instructions, when executed by a processor, cause the processor to implement any above method for invoking the touch screen magnifier.

BRIEF DESCRIPTION OF THE DRAWINGS

In order to illustrate one or more embodiments of the present application or technical solutions in the related art more clearly, the drawings required for the description of the embodiments or the related art will be briefly described. Obviously, the drawings described below are only one or more embodiments of the present application. For a person skilled in the art, other drawings can also be obtained from these drawings without any inventive effort.

DETAILED DESCRIPTION

Figure 1:
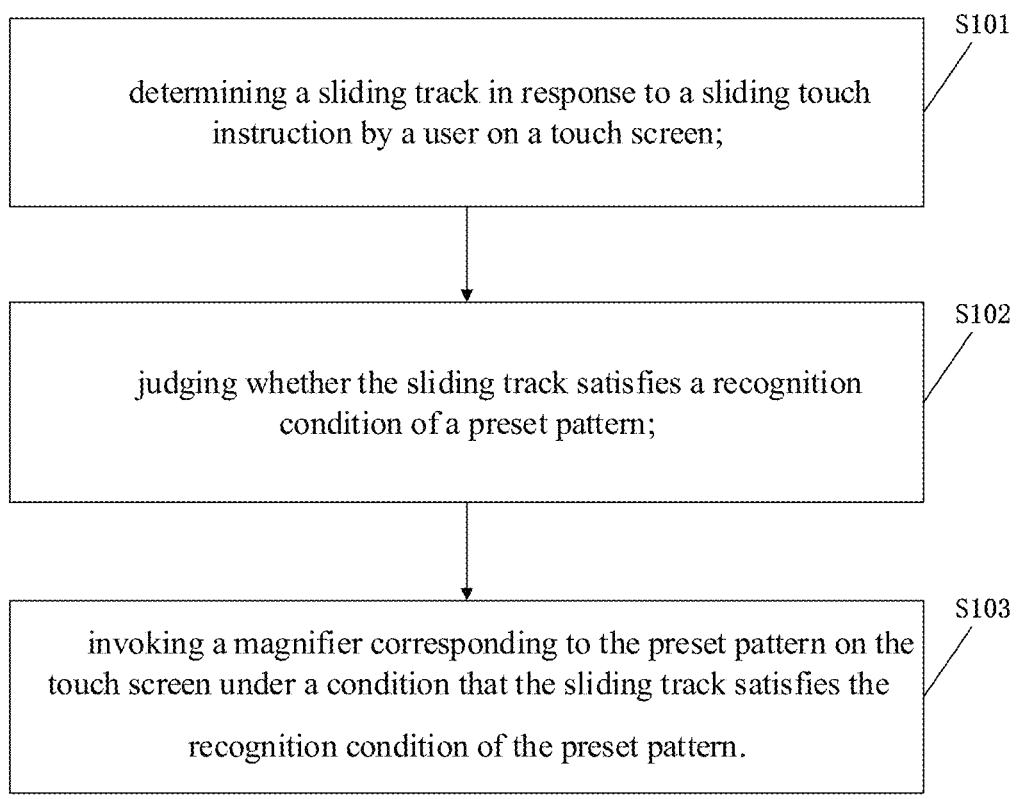
FIG. 1 is a flow chart of a method for invoking a touch screen magnifier according to one or more embodiments of the present application.

In order to make the objects, technical solutions and advantages of the present disclosure clearer, the present disclosure is further described in detail below with reference to the specific embodiments and the drawings.

It should be noted that, unless otherwise defined, technical or scientific terms used in one or more embodiments of the present application shall have the ordinary meaning as understood by one with ordinary skill in the art to which this disclosure belongs. Terms such as "first", "second" and the like used in one or more embodiments of the present application do not show any order, quantity, or importance, but rather are used to distinguish one component from another. Terms such as "comprising" or "including" and the like are intended that an element or an item preceding the term encompasses an element or an item and an equivalent thereof listed after the term, but does not exclude other elements or items. Terms such as "connecting" or "connected" and the like are not limited to physical or mechanical connections, but may include electrical connections, direct or indirect. Terms such as "above", "under", "left", "right" and the like are used only to show relative positional relationships that may change accordingly when an absolute position of a described object changes.

Through research, the inventors have found that, in the related art, under a condition that a magnifier is used in a touch screen, a mouse is frequently used to click on the magnifier, and such frequent clicking would inevitably cause a tedious operation, thereby causing a problem of poor user experience. In the related art, under a condition that a user wants to use a magnifier function of a touch screen, it is necessary to use a mouse, a finger or a touch pen to click on a magnifier function icon, then drag the invoked magnifier to a position of an image to be magnified, click on a zoom-in or zoom-out multiple to zoom in or zoom out the image, and a shape of the magnifier is fixed. Therefore, there is a problem in the related art that a magnifier of a corresponding shape cannot be invoked by sketching a pattern on the touch screen, and the zoom-in or zoom-out multiple of the magnifier is required to be controlled by a clicking operation, resulting in an inconvenient user operation and the poor user experience. Through research, the inventors have found that, a sliding track can be sketched on a touch screen by using a finger or other devices which can achieve a touch operation on their touch screen, and magnifiers of different shapes corresponding to a shape of the sliding track are invoked by judging whether the sliding track satisfies a preset pattern, so that the magnifier function can be invoked more rapidly, and the magnifier can be invoked without frequently clicking the magnifier. In the present application, it is judged that whether the sliding track approximates to the preset pattern, so that a magnifier approximate to a shape of a pattern of the sliding track is invoked, and thus the user can invoke magnifiers of different shapes when using the magnifier, thereby satisfying user's requirement for magnifying some images with special shapes, greatly improving user's use experience.

In view of the above research findings of the inventors, as shown in FIG. 1, a method for invoking a touch screen magnifier provided by one or more embodiments of the present application specifically includes steps S101 and S102.

S101: determining a sliding track in response to a sliding touch instruction by a user on a touch screen.

In this embodiment, according to requirements of a specific implementation scenario, a plurality of extended touch screens only having a display function may be connected on a main touch screen, and a touch operation is performed on any of the touch screens by using a split-screen technology, so that a sliding track can be determined on a corresponding touch screen that is touched. Specifically, a user slides on any of the touch screens by using a finger or a touch pen and sketches a sliding track by continuous touch sliding, and the sliding track sketched by the user is determined in response to a sliding touch instruction by the user on a touch screen, so that the sliding track is displayed on the touch screen, and the sliding track may be of any pattern. The sliding track is sketched on different touch screens so that the sliding track is determined on the corresponding touch screen, and therefore different touch screens are invoked flexibly by the user to improve the user experience.

As an optional embodiment, the sliding track sketched by the user may be a closed pattern, a non-closed pattern, a line segment, a circular arc, or any irregular track.

S102: judging whether the sliding track satisfies a recognition condition of a preset pattern.

In this embodiment, after the sliding track is determined, it is necessary to judge whether the sliding track satisfies the recognition condition of the preset pattern, and in fact, that is, key information is extracted according to the sliding track so as to judge whether the sliding track approximates to the preset pattern. As an optional embodiment, the S102 may specifically include: extracting a set of key points according to the sliding track, and the set of key points includes at least five key points: a first key point, a second key point, a third key point, a fourth key point and a fifth key point, the first key point is a starting point of the sliding track, and the fifth key point is an ending point of the sliding track; and then judging whether the sliding track satisfies the recognition condition of the preset pattern based on the key points in the set of key points. Moreover, it may be determined that whether the sliding track satisfies the recognition condition of the preset pattern according to any judging method for judging whether a track approximates to a specific pattern. In a specific example, firstly, a recognition model may be constructed based on a machine learning algorithm; secondly, the recognition model is trained by using different sliding tracks and preset patterns to obtain a final recognition model; and finally, the determined sliding track is input into the final recognition model so as to judge whether the sliding track satisfies the recognition condition of the preset pattern.

Figure 2:
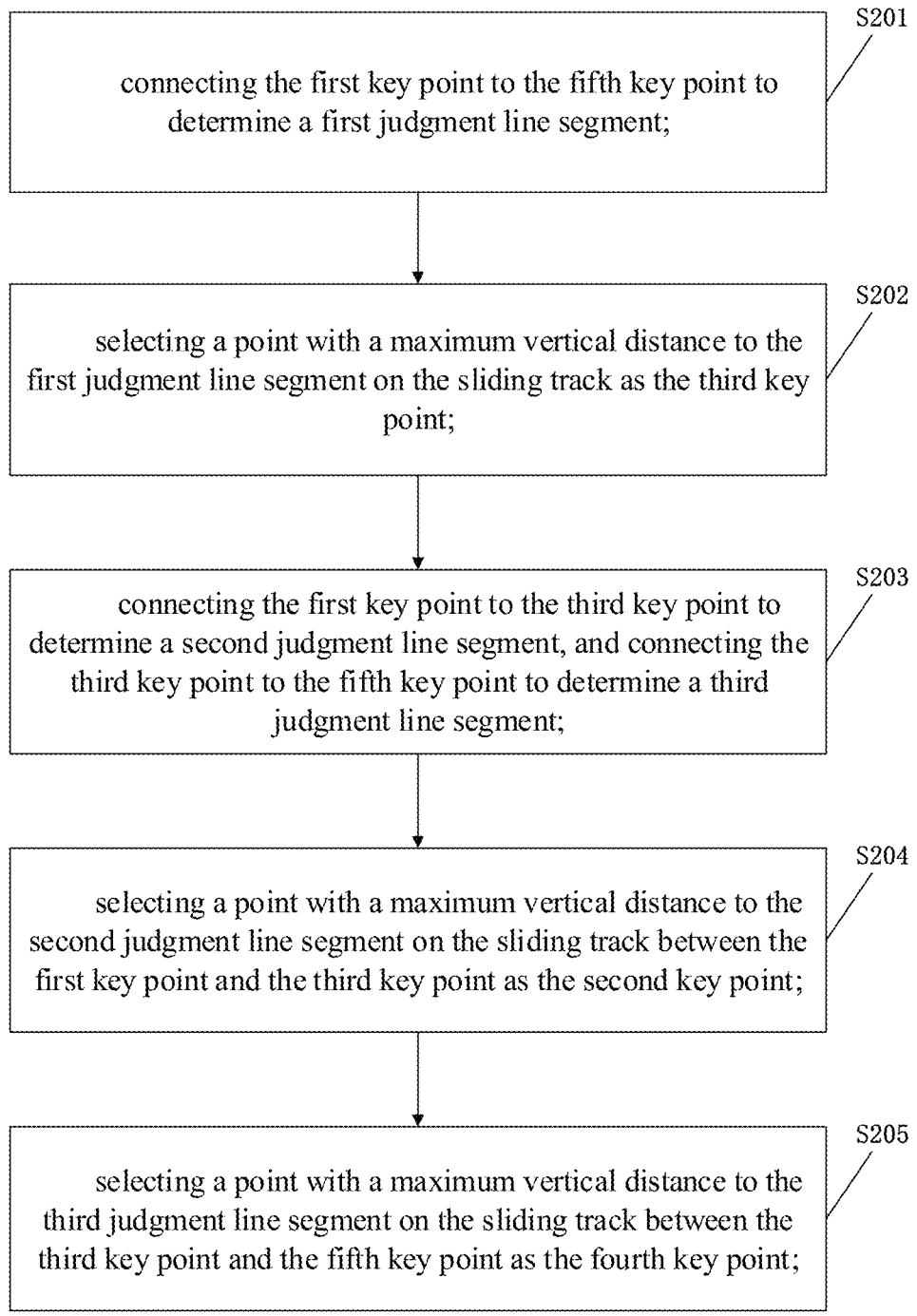
FIG. 2 is a flow chart of extracting key points from a sliding track according to one or more embodiments of the present application.

As an optional embodiment, the set of key points are selected so that an entire sliding track can be characterized by using only a few points, and the set of key points can be rapidly extracted after the starting point and ending point of the track are determined. With reference to FIG. 2, in one example, extracting the set of key points according to the sliding track may specifically include steps S201, S202, S203, S204 and S205.

S201: connecting the first key point to the fifth key point to determine a first judgment line segment.

In this embodiment, the first key point is connected to the fifth key point, that is, the starting point of the track is connected to the ending point of the track to determine the first judgment line segment.

S202: selecting a point with a maximum vertical distance to the first judgment line segment on the sliding track as the third key point.

In this embodiment, a point with the maximum vertical distance to the first judgment line segment is selected on the sliding track and is determined as the third key point. The point with the maximum vertical distance to the first judgment line segment is selected, so that relatively evenly spaced key points can be found as far as possible so as to avoid finding the key points with too small spacing and resulting in inaccuracy in subsequent judgment of the sliding track.

S203: connecting the first key point to the third key point to determine a second judgment line segment, and connecting the third key point to the fifth key point to determine a third judgment line segment.

In this embodiment, the first key point is connected to the third key point, that is, the starting point of the track is connected to the third point to determine the second judgment line segment. The third key point is connected to the fifth key point, that is, the third key point is connected to the ending point of the track so as to determine the third judgment line segment. That is, the sliding track may be divided into two parts, one part is a track between the starting point of the track and the third key point, and the other part is a track between the third key point and the ending point of the track. After the sliding track is divided into two parts, the key points are selected from two different parts, respectively, so that evenly distributed key points can be obtained to avoid that a distance between multiple key points is too small while a distance between other key points is too large, and resulting in inaccurate characterization of the sliding track.

S204: selecting a point with a maximum vertical distance to the second judgment line segment on the sliding track between the first key point and the third key point as the second key point.

In this embodiment, the point with the maximum vertical distance to the second judgment line segment is selected on the sliding track between the first key point (that is, the starting point of the track) and the third key point and is determined as the second key point.

S205: selecting a point with a maximum vertical distance to the third judgment line segment on the sliding track between the third key point and the fifth key point as the fourth key point.

In this embodiment, the point with the maximum vertical distance to the third judgment line segment is selected on the sliding track between the third key point and the fifth key point (that is, the ending point of the track) and is determined as the fourth key point.

Figure 3:
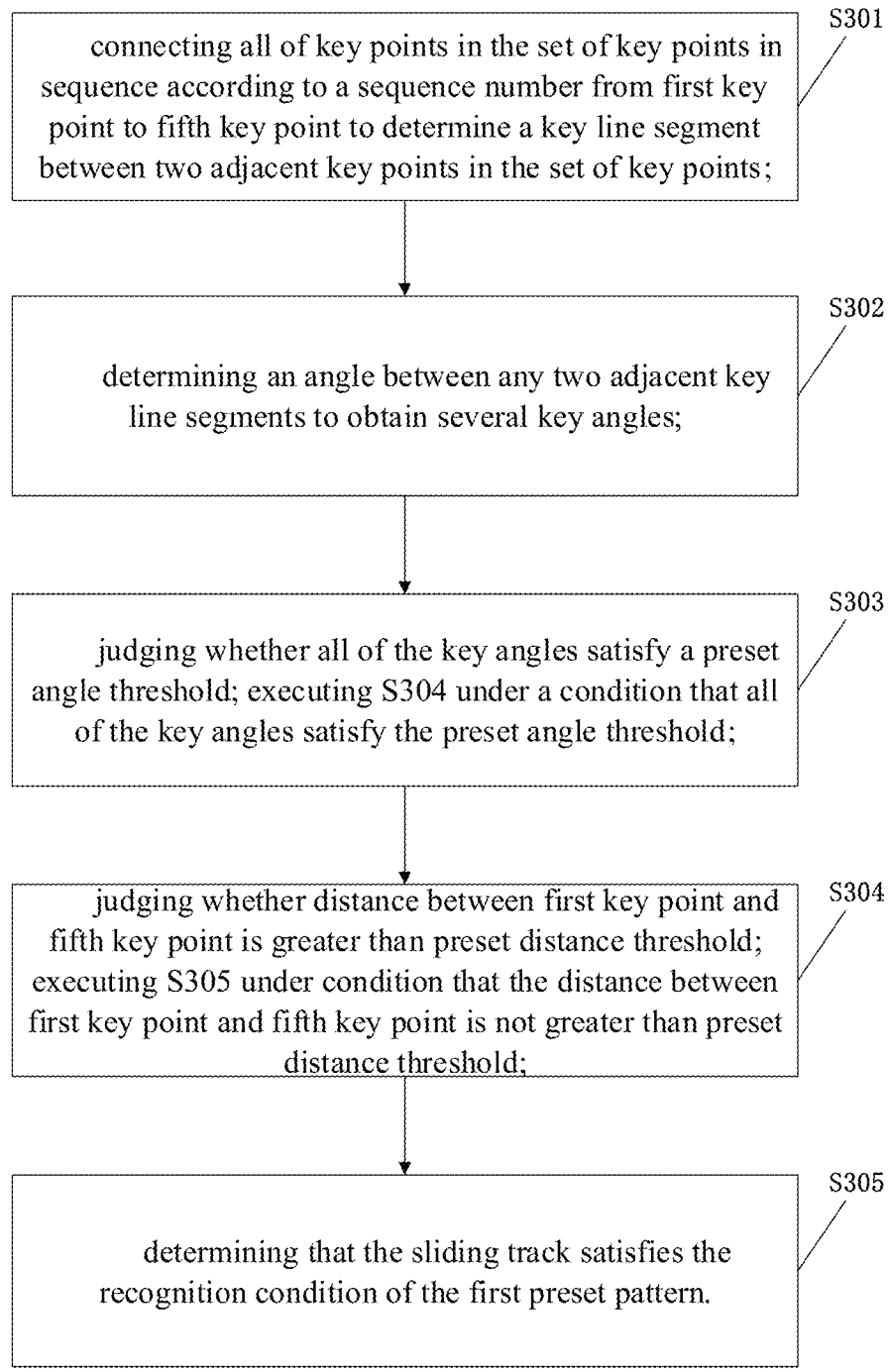
FIG. 3 is a flow chart of judging a recognition condition of a first preset pattern according to one or more embodiments of the present application.

After all the key points in the set of key points are obtained according to the above steps, it is further judged whether the sliding track satisfies the recognition condition of the preset pattern based on the key points in the set of key points. With reference to FIG. 3, the preset pattern may include a first preset pattern, and in one specific example, the first preset pattern is a preset rectangle. Judging whether the sliding track satisfies the recognition condition of the preset pattern based on the key points in the set of key points specifically includes steps S301, S302, S303, S304 and S305.

S301: connecting all of the key points in the set of key points in sequence from the starting point of the track to the ending point of the track to determine a key line segment between two adjacent key points in the set of key points.

In this embodiment, the key line segments may include a first key line segment, a second key line segment, a third key line segment and a fourth key line segment. Since a position of the second key point on the sliding track is located between the starting point of the track and the third key point, and a position of the fourth key point on the sliding track is located between the third key point and the ending point of the track, the first key point (that is, the starting point of the track) is connected to the second key point in sequence to determine the first key line segment, the second key point is connected to the third key point to determine the second key line segment, the third key point is connected to the fourth key point to determine the third key line segment, and the fourth key point is connected to the fifth key point (that is, the ending point of the track) to determine the fourth key line segment.

S302: determining an angle between any two adjacent key line segments to obtain several key angles.

In this embodiment, the key angle may include a first key angle, a second key angle and a third key angle. An angle between the first key line segment and the second key line segment is the first key angle, an angle between the second key line segment and the third key line segment is the second key angle, and an angle between the third key line segment and the fourth key line segment is the third key angle.

S303: judging whether all of the key angles satisfy a preset angle threshold. S304 is executed under a condition that all of the key angles satisfy the preset angle threshold.

In this embodiment, the key angle is set as θ, and it is judged whether all of the key angles satisfy the preset angle threshold. In one specific example, the preset angle threshold is an upper and lower limit of a cosine value of the key angle, that is, $0 \leq |\cos \theta| \leq 0.1$, and under a condition that cosine values of all of the key angles satisfy the preset angle threshold, all of the key angles satisfy the preset angle threshold value, and then S304 is executed. In another specific example, a preset angle is set, under a condition that $85° < \theta < 95°$, the key angle satisfies the preset angle, and under a condition that angles of all of the key angles satisfy the preset angle, all of the key angles satisfy the preset angle threshold, and S304 is executed.

S304: judging whether the distance between the first key point and the fifth key point is greater than a preset distance threshold. S305 is executed under a condition that the distance between the first key point and the fifth key point is not greater than the preset distance threshold.

In this embodiment, under a condition that all of the key angles satisfy the preset angle threshold, it is further judged whether the distance between the first key point (that is, the starting point of the track) and the fifth key point (that is, the ending point of the track) is greater than the preset distance threshold, that is, it is judged whether the starting point of the track approximately overlaps the ending point of the track, by which it is judged whether the sliding track is approximately closed. In one specific example, the preset distance threshold is 5 pixel points, and it is judged whether a distance between the first key point and the fifth key point is greater than 5 pixel points so as to judge whether the first key point approximately overlaps the fifth key point, that is, whether the sliding track is approximately closed. Under a condition that the distance between the first key point and the fifth key point is not greater than 5 pixel points, it is proved that the distance between the first key point and the fifth key point is not greater than the preset distance threshold, and S305 is executed.

S305: determining that the sliding track satisfies the recognition condition of the first preset pattern.

In this embodiment, under a condition that angles of the key angles are approximately right angles, the sliding track is approximately closed, and then it is determined that the sliding track satisfies the recognition condition of the preset pattern, and the sliding track is recognized as the first preset pattern.

As an optional embodiment, through the judgment in S304, under a condition that the distance between the first key point and the fifth key point is greater than the preset distance threshold, the sliding track cannot be approximately closed, and a sliding track is redetermined in response to the sliding touch instruction by the user on a touch screen through S101, and it is judged whether the redetermined sliding track satisfies the recognition condition of the first preset pattern through the above steps.

Figure 4:
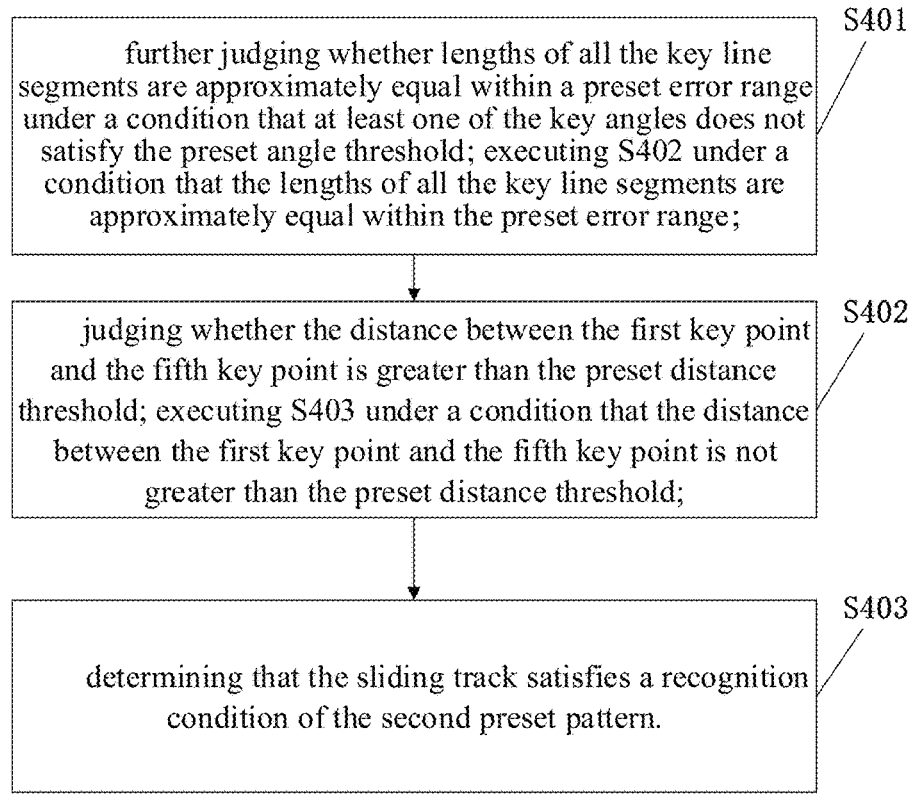
FIG. 4 is a flow chart of judging a recognition condition of a second preset pattern according to one or more embodiments of the present application.

As an optional embodiment, under a condition that at least one of the key angles in S303 does not satisfy the preset angle threshold, it is proved that the sliding track cannot be recognized as the first preset pattern, and a next judgment is made. With reference to FIG. 4, the preset pattern may include a second preset pattern. In one specific example, the second preset pattern is a preset diamond. After it is judged whether all of the key angles satisfy the preset angle threshold, the method may specifically include steps S401, S402 and S403.

S401: further judging whether lengths of all the key line segments are approximately equal within a preset error range under a condition that at least one of the key angles does not satisfy the preset angle threshold. S402 is executed under a condition that the lengths of all the key line segments are approximately equal within the preset error range.

In this embodiment, the lengths of all the key line segments are obtained and compared. Further, using a judgment condition that whether the lengths of all the key line segments are approximately equal within the preset error range means that, it is judged whether a difference between a longest key line segment and a shortest key line segment is within the preset error range. In one specific example, the preset error range is three pixel points, it is judged whether a difference between a length of the longest key line segment and a length of the shortest key line segment is less than three pixel points, and under a condition that the difference between the length of the longest key line segment and the length of the shortest key line segment is less than three pixel points, it is proved that the lengths of all the key line segments are approximately equal within the preset error range, and S402 is executed.

S402: judging whether the distance between the first key point and the fifth key point is greater than the preset distance threshold. S403 is executed under a condition that the distance between the first key point and the fifth key point is not greater than the preset distance threshold.

In this embodiment, under a condition that the lengths of all the key line segments are approximately equal within the preset error range, that is, the difference between the length of the longest key line segment and the length of the shortest key line segment is within the preset error range, it is further judged whether the distance between the first key point (that is, the starting point of the track) and the fifth key point (that is, the ending point of the track) is greater than the preset distance threshold, that is, it is judged whether the starting point of the track approximately overlaps the ending point of the track, by which it is judged whether the sliding track is approximately closed. In one specific example, the preset distance threshold is 5 pixel points, and it is judged whether the distance between the first key point and the fifth key point is greater than 5 pixel points so as to judge whether the first key point approximately overlaps the fifth key point, that is, whether the sliding track is approximately closed. Under a condition that the distance between the first key point and the fifth key point is not greater than 5 pixel points, it is proved that the distance between the first key point and the fifth key point is not greater than the preset distance threshold, and S403 is executed.

S403: determining that the sliding track satisfies a recognition condition of the second preset pattern.

In this embodiment, under a condition that the lengths of all the key line segments are approximately equal within the preset error range, the sliding track is approximately closed, the sliding track satisfies the recognition condition of the second preset pattern, and the sliding track is recognized as the second preset pattern.

As an optional embodiment, through the judgment in S402, under a condition that the distance between the first key point and the fifth key point is greater than the preset distance threshold, the sliding track cannot be approximately closed, and a sliding track is redetermined in response to the sliding touch instruction by the user on a touch screen through S101, and it is judged whether the redetermined sliding track satisfies the recognition condition of the second preset pattern through the above steps.

Figure 5:
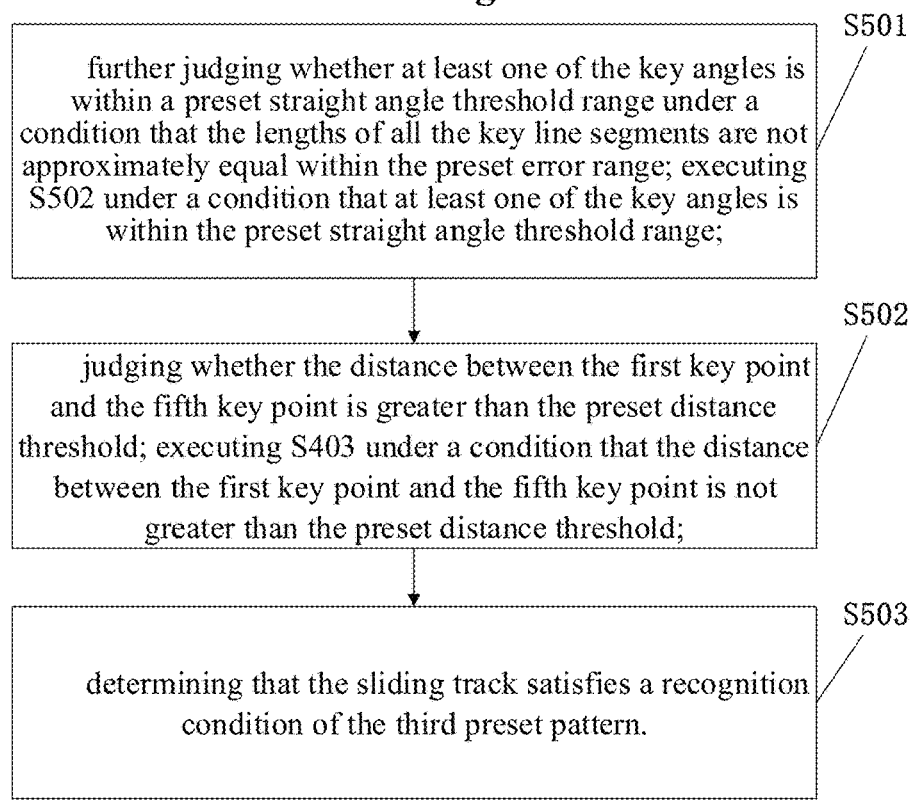
FIG. 5 is a flow chart of judging a recognition condition of a third preset pattern according to one or more embodiments of the present application.

As an optional embodiment, under a condition that the lengths of all the key line segments are not approximately equal within the preset error range in S401, it is proved that the sliding track cannot be recognized as the second preset pattern, and a next judgment is made. With reference to FIG. 5, the preset pattern may include a third preset pattern. In one specific example, the third preset pattern is a preset triangle. After it is judged whether the lengths of all the key line segments are approximately equal within the preset error range, the method may specifically include steps S501, S502 and S503.

S501: further judging whether at least one of the key angles is within a preset straight angle threshold range under a condition that the lengths of all the key line segments are not approximately equal within the preset error range. S502 is executed under a condition that at least one of the key angles is within the preset straight angle threshold range.

In this embodiment, angle values of all the key angles are obtained and compared with a preset straight angle threshold. In one specific example, it is judged whether a key angle is between 175° and 185° so as to judge whether at least one of the key angles is within the preset straight angle threshold range and judge whether the key angle is approximately a straight angle. It is judged that the key angle is approximately the straight angle, so that two adjacent key line segments constituting the key angle are approximately on a same straight line, a next judgment is made continuously, and S502 is executed.

S502: judging whether the distance between the first key point and the fifth key point is greater than the preset distance threshold. S503 is executed under a condition that the distance between the first key point and the fifth key point is not greater than the preset distance threshold.

In this embodiment, under a condition that an angle value of at least one of the key angles is within the preset straight angle threshold range, it is further judged whether the distance between the first key point (that is, the starting point of the track) and the fifth key point (that is, the ending point of the track) is greater than the preset distance threshold, that is, it is judged whether the starting point of the track approximately overlaps the ending point of the track, by which it is judged whether the sliding track is approximately closed. In one specific example, the preset distance threshold is 5 pixel points, and it is judged whether the distance between the first key point and the fifth key point is greater than 5 pixel points so as to judge whether the first key point approximately overlaps the fifth key point, that is, whether the sliding track is approximately closed. Under a condition that the distance between the first key point and the fifth key point is not greater than 5 pixel points, it is proved that the distance between the first key point and the fifth key point is not greater than the preset distance threshold, and S503 is executed.

S503: determining that the sliding track satisfies a recognition condition of the third preset pattern.

In this embodiment, under a condition that the angle value of at least one of the key angles is within the preset straight angle threshold range, the sliding track is approximately closed, the sliding track satisfies the recognition condition of the third preset pattern, and the sliding track is recognized as the third preset pattern.

As an optional embodiment, through the judgment in S502, under a condition that the distance between the first key point and the fifth key point is greater than the preset distance threshold, the sliding track cannot be approximately closed, and a sliding track is redetermined in response to the sliding touch instruction by the user on a touch screen through S101, and it is judged whether the redetermined sliding track satisfies the recognition condition of the third preset pattern through the above steps.

Figure 6:
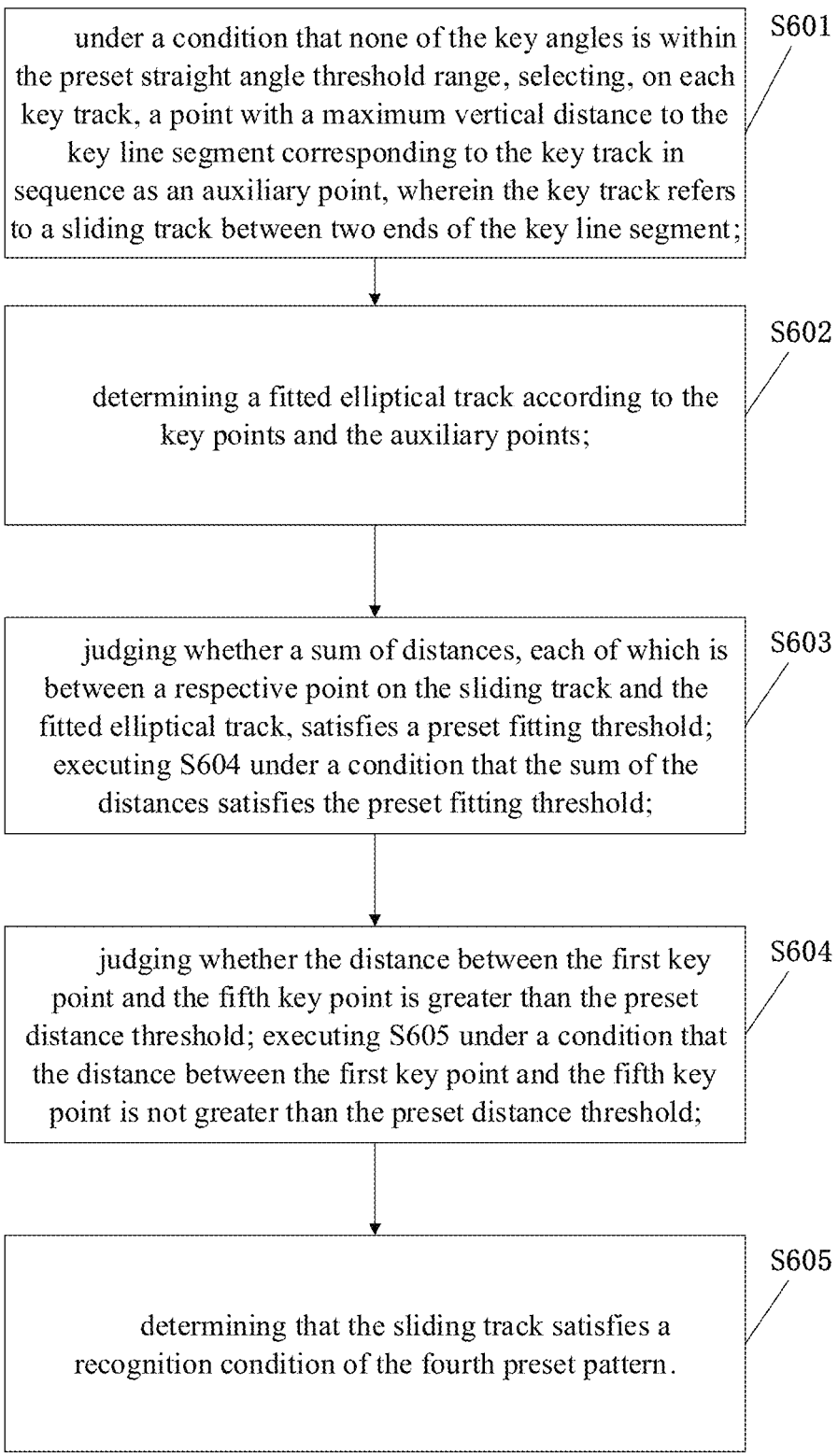
FIG. 6 is a flowchart of judging a recognition condition of a fourth preset pattern according to one or more embodiments of the present application.

As an optional embodiment, under a condition that none of the key angles is within the preset straight angle threshold range in S501, it is proved that the sliding track cannot be recognized as the third preset pattern, and a next judgment is made. With reference to FIG. 6, the preset pattern may include a fourth preset pattern. In one specific example, the fourth preset pattern is a preset circle. After it is judged whether at least one of the key angles is within the preset straight angle threshold range, the method may specifically include steps S601, S602, S603, S604 and S605.

S601: under a condition that none of the key angles is within the preset straight angle threshold range, selecting, on each key track, a point with a maximum vertical distance to the key line segment corresponding to the key track in sequence as an auxiliary point, wherein the key track refers to a sliding track between two ends of the key line segment.

In this embodiment, the sliding track between two ends of the key line segment is determined as a key track corresponding to the key line segment, and the key track includes a first key track, a second key track, a third key track and a fourth key track. Specifically, a sliding track between the first key point (that is, the starting point of the track) and the second key point is determined as the first key track corresponding to the first key line segment, a sliding track between the second key point and the third key point is determined as the second key track corresponding to the second key line segment, a sliding track between the third key point and the fourth key point is determined as the third key track corresponding to the third key line segment, and a sliding track between the fourth key point and the fifth key point (that is, the ending point of the track) is determined as the fourth key track corresponding to the fourth key line segment.

The point with the maximum vertical distance to the key line segment corresponding to the key track in sequence is selected on each key track as the auxiliary point. Specifically, a point with a maximum vertical distance to the first key line segment is selected on the first key track as an auxiliary point, a point with a maximum vertical distance to the second key line segment is selected on the second key track as an auxiliary point, a point with a maximum vertical distance to the third key line segment is selected on the third key track as an auxiliary point, and a point with a maximum vertical distance to the fourth key line segment is selected on the fourth key track as an auxiliary point.

S602: determining a fitted elliptical track according to the key points and the auxiliary points.

In this embodiment, the fitted elliptical track is determined according to all the key points and the auxiliary points, the sliding track includes several initial information points, and all of the key points and the auxiliary points are selected from the initial information points. In one specific example, the initial information points are obtained according to a system algorithm, and after all of the key points and the auxiliary points are selected, the fitted elliptical track is determined according to the key points and the auxiliary points. In another specific example, an information point selecting model can be constructed based on a machine learning algorithm, the initial information points are selected by the information point selecting model, all of the key points and the auxiliary points are selected from the initial information points, and the fitted elliptical track is determined according to the key points and the auxiliary points.

S603: judging whether a sum of distances, each of which is between a respective point on the sliding track and the fitted elliptical track, satisfies a preset fitting threshold. S604 is executed under a condition that the sum of the distances satisfies the preset fitting threshold.

In this embodiment, the distances, each of which is between a respective point on the sliding track and the fitted elliptical track, are obtained, and it is judged whether the sum of the distances satisfies the preset fitting threshold. In one specific example, $D_1, D_2 \ldots$ and $D_n$ represent the distances, each of which is between a respective point on the sliding track and the fitted elliptical track, and n represents a number of the initial information points, under a condition that $$\frac{(D_1 + D_2 + \ldots + D_n)^2}{n} \leq 5 \text{ pixel points,}$$

the sum of the distances satisfies the preset fitting threshold. By judging whether the sum of the distances, each of which is between a respective point on the sliding track and the fitted elliptical track, satisfies the preset fitting threshold, it can be rapidly judged whether the sliding track approximates to the fitted elliptical track, and after it is judged that the sum of the distances, each of which is between a respective point on the sliding track and the fitted elliptical track, satisfies the preset fitting threshold, a next judgment is made continuously, and S604 is executed.

S604: judging whether the distance between the first key point and the fifth key point is greater than the preset distance threshold. S605 is executed under a condition that the distance between the first key point and the fifth key point is not greater than the preset distance threshold.

In this embodiment, after it is judged that the sum of the distances, each of which is between a respective point on the sliding track and the fitted elliptical track, satisfies the preset fitting threshold, it is further judged whether the distance between the first key point (that is, the starting point of the track) and the fifth key point (that is, the ending point of the track) is greater than the preset distance threshold, that is, it is judged whether the starting point of the track approximately overlaps the ending point of the track, by which it is judged whether the sliding track is approximately closed. In one specific example, the preset distance threshold is 5 pixel points, and it is judged whether the distance between the first key point and the fifth key point is greater than 5 pixel points so as to judge whether the first key point approximately overlaps the fifth key point, that is, whether the sliding track is approximately closed. Under a condition that the distance between the first key point and the fifth key point is not greater than 5 pixel points, it is proved that the distance between the first key point and the fifth key point is not greater than the preset distance threshold, and S605 is executed.

S605: determining that the sliding track satisfies a recognition condition of the fourth preset pattern.

In this embodiment, under a condition that it is judged that the sum of the distances, each of which is between a respective point on the sliding track and the fitted elliptical track, satisfies the preset fitting threshold, the sliding track is approximately closed, the sliding track satisfies the recognition condition of a fourth preset pattern, and the sliding track is recognized as the fourth preset pattern.

As an optional embodiment, through the judgment in S604, under a condition that the distance between the first key point and the fifth key point is greater than the preset distance threshold, the sliding track cannot be approximately closed, and a sliding track is redetermined in response to the sliding touch instruction by the user on a touch screen through S101, and it is judged whether the redetermined sliding track satisfies the recognition condition of the fourth preset pattern through the above steps.

S103: invoking a magnifier corresponding to the preset pattern on the touch screen under a condition that the sliding track satisfies the recognition condition of the preset pattern.

In this embodiment, under a condition that the sliding track satisfies the recognition condition of the preset pattern, the magnifier corresponding to the preset pattern is invoked on the touch screen. In one specific example, under a condition that a sliding track satisfies the recognition condition of the first preset pattern, a magnifier corresponding to the first preset pattern is invoked on the touch screen; under a condition that a sliding track satisfies the recognition condition of the second preset pattern, a magnifier corresponding to the second preset pattern is invoked on the touch screen; under a condition that a sliding track satisfies the recognition condition of the third preset pattern, a magnifier corresponding to the third preset pattern is invoked on the touch screen; and under a condition that a sliding track satisfies the recognition condition of the fourth preset pattern, a magnifier corresponding to the fourth preset pattern is invoked on the touch screen.

Figure 7:
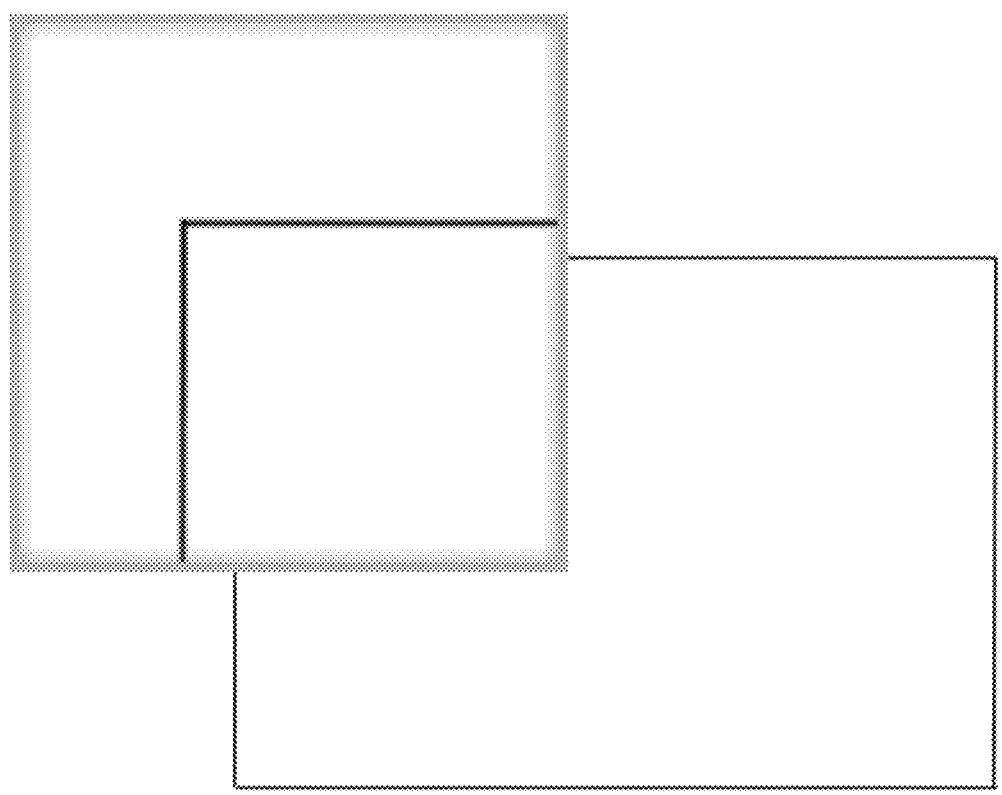
FIG. 7 is a diagram in a rectangular shape of a magnifier invoking effect according to one or more embodiments of the present application.
Figure 8:
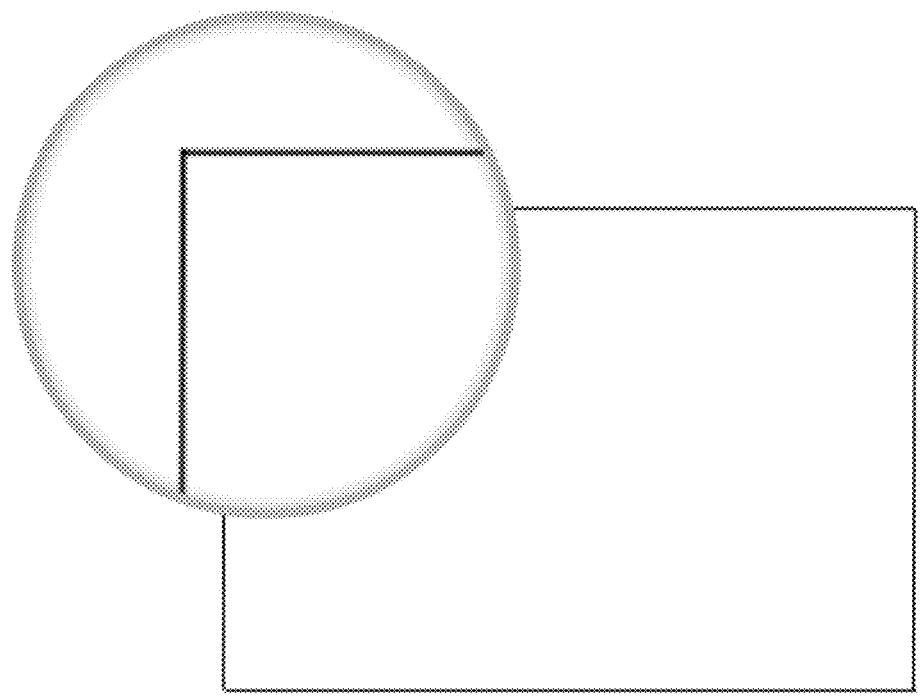
FIG. 8 is a diagram in a circular shape of a magnifier invoking effect according to one or more embodiments of the present application.

As an optional embodiment, magnifiers corresponding to the preset patterns may include a rectangular magnifier, a diamond magnifier, a triangular magnifier and a circular magnifier. In one specific example, with reference to FIG. 7, under a condition that the sliding track is recognized as the first preset pattern, that is, the preset rectangle, the rectangular magnifier is invoked on the touch screen; and in another specific example, with reference to FIG. 8, under a condition that the sliding track is recognized as the fourth preset pattern, that is, the preset circle, the circular magnifier is invoked on the touch screen.

As an optional embodiment, wherever the user sketches the sliding track on the touch screen, the magnifier corresponding to the preset pattern is invoked at a central position of the touch screen, and the invoked magnifier can be dragged by the user to a position of an image to be zoomed so that the image to be magnified is zoomed out or zoomed in.

As an optional embodiment, after the sliding track satisfies the recognition condition of the preset pattern, the magnifier corresponding to the preset pattern is invoked at a position of the touch screen corresponding to the sliding track, and the user can zoom in or zoom out the image to be magnified by the invoked magnifier; and under a condition that the user needs to change a position of the magnified image, the invoked magnifier can be dragged by the user to the position of the image to be zoomed.

As an optional embodiment, a size of the invoked magnifier corresponding to the preset pattern on the touch screen is fixed.

As an optional embodiment, the size of the invoked magnifier corresponding to the preset pattern on the touch screen corresponds to a size of the sliding track sketched by the user. For example, under a condition that the sliding track sketched by the user is recognized as a preset circle with a radius of 10 cm, the touch screen invokes a circular magnifier with a radius of 10 cm.

As an optional embodiment, after the magnifier corresponding to the preset pattern is invoked on the touch screen, a first operation region, a second operation region, a first target image and a second target image are determined; the first operation region refers to a magnified region of the magnifier, the second operation region refers to the touch screen outside the first operation region, the first target image refers to a target image corresponding to the first operation region, and the second target image refers to a target image corresponding to the second operation region. A size of the first target image is gradually reduced into a first size in response to a first touch instruction, and the first touch instruction refers to approaching of at least two fingers of the user in the first operation region. Under a condition that the user starts to touch the magnified region by using at least two fingers, a distance between touch points corresponding to the at least two fingers is recorded as a first initial distance, and under a condition that the user completes the touch on the magnified region by using the at least two fingers, a distance between touch points corresponding to the at least two fingers is recorded as a first ending distance. Whether the size of the first target image needs to be reduced is judged by comparing whether the first initial distance is greater than the first ending distance. Under a condition that the first ending distance is less than the first initial distance, it is proved that the at least two fingers approach on the magnified region, and the size of the first target image is gradually reduced into the first size. A reduced proportion of the size of the first target image is determined by a difference between the first initial distance and the first ending distance, the greater the difference between the first initial distance and the first ending distance is, the greater the degree is to which the size of the first target image is reduced.

As an optional embodiment, the size of the first target image is gradually increased into a second size in response to a second touch instruction by the user, and the second touch instruction refers to moving away of at least two fingers of the user from each other in the first operation region. Under a condition that the user starts to touch the magnified region by using at least two fingers, a distance between touch points corresponding to the at least two fingers is recorded as a second initial distance, and under a condition that the user completes the touch on the magnified region by using the at least two fingers, a distance between touch points corresponding to the at least two fingers is recorded as a second ending distance. Whether the size of the first target image needs to be increased is judged by comparing whether the second initial distance is less than the second ending distance. Under a condition that the second ending distance is greater than the second initial distance, it is proved that the at least two fingers move away from each other on the magnified region, and the size of the first target image is gradually increased into the second size. An increased proportion of the size of the first target image is determined by a difference between the second initial distance and the second ending distance, the greater the difference between the second ending distance and the second initial distance is, the greater the degree is to which the size of the first target image is increased.

As an optional embodiment, a size of the second target image is gradually reduced into a third size in response to a third touch instruction, and the third touch instruction refers to approaching of at least two fingers of the user in the second operation region. Under a condition that the user starts to touch the second operation region by using at least two fingers, a distance between touch points corresponding to the at least two fingers is recorded as a third initial distance, and under a condition that the user completes the touch on the second operation region by using the at least two fingers, a distance between touch points corresponding to the at least two fingers is recorded as a third ending distance. Whether the size of the second target image needs to be reduced is judged by comparing whether the third initial distance is greater than the third ending distance. Under a condition that the third ending distance is less than the third initial distance, it is proved that the at least two fingers approach on the second operation region, and the size of the second target image is gradually reduced into the third size. A reduced proportion of the size of the second target image is determined by a difference between the third initial distance and the third ending distance, the greater the difference between the third initial distance and the third ending distance is, the greater the degree is to which the size of the second target image is reduced.

As an optional embodiment, the size of the second target image is gradually increased into a fourth size in response to a fourth touch instruction by the user, and the fourth touch instruction refers to moving away of at least two fingers of the user from each other in the second operation region. Under a condition that the user starts to touch the second operation region by using at least two fingers, a distance between touch points corresponding to the at least two fingers is recorded as a fourth initial distance, and under a condition that the user completes the touch on the second operation region by using the at least two fingers, a distance between touch points corresponding to the at least two fingers is recorded as a fourth ending distance. Whether the size of the second target image needs to be increased is judged by comparing whether the fourth initial distance is less than the fourth ending distance. Under a condition that the fourth ending distance is greater than the fourth initial distance, it is proved that the at least two fingers move away from each other on the second operation region, and the size of the second target image is gradually increased into the fourth size. An increased proportion of the size of the second target image is determined by a difference between the fourth initial distance and the fourth ending distance, the greater the difference between the fourth ending distance and the fourth initial distance is, the greater the degree is to which the size of the second target image is increased.

As an optional embodiment, under a condition that a plurality of extended touch screens only having a display function are connected to a main touch screen, and the user implements the method for invoking, on the main touch screen, the magnifier according to one or more embodiments of the present application, the magnifier corresponding to the preset pattern is invoked on the main touch screen after the sliding track satisfies the recognition condition of the preset pattern; under a condition that the user implements the method for invoking, on any extended touch screen, the magnifier according to one or more embodiments of the present application, the magnifier corresponding to the preset pattern is invoked on the extended touch screen after the sliding track satisfies the recognition condition of the preset pattern.

As an optional embodiment, under a condition that a plurality of touch display apparatuses only having a display function are connected to a processor with data processing, and the user implements the method for invoking, on any touch display apparatus, the magnifier according to one or more embodiments of the present application, the magnifier corresponding to the preset pattern is invoked on the touch display apparatus after the sliding track satisfies the recognition condition of the preset pattern.

It may be seen from the above that the method for invoking the touch screen magnifier according to one or more embodiments of the present application includes: determining the sliding track in response to the sliding touch instruction by the user on the touch screen, and displaying the sliding track so that an operating user can see the sketched track clearly, and can re-sketch the sliding track according to the sketched track under a condition that the sliding track does not satisfy the recognition condition of the preset pattern; judging whether the sliding track satisfies the recognition condition of the preset pattern; invoking the magnifier corresponding to the preset pattern on the touch screen under a condition that the sliding track satisfies the recognition condition of the preset pattern. The magnifier corresponding to the shape of the preset pattern on the touch screen is invoked for being used by the user under a condition that the sliding track is recognized as the preset pattern, so that the user can zoom in or zoom out whole or a part of the image by the invoked magnifier. Without using a traditional method to click a magnifier function icon on the touch screen with a mouse so as to invoke the magnifier, the sliding track sketched by the user on the touch screen is determined in the present application to recognize that whether the sliding track satisfies the condition for invoking the magnifier, so that after the sliding track satisfies the recognition condition, a magnifier of a corresponding shape of a preset pattern corresponding to the sliding track is invoked to improve user experience, thereby simplifying an invoking operation of the magnifier of the touch screen. The method according to one or more embodiments of the present application can perform a touch operation on a touch screen by a gesture, that is, by at least two fingers of the user, so that an image on a magnified region of the magnifier is zoomed in or zoomed out, and meanwhile, an image on a screen touch region outside the magnified region is zoomed in or zoomed out, and thus the operation of the touch screen magnifier is enriched, thereby further improving user's operation experience.

The above describes the particular embodiments of the present application. Other embodiments are within the scope of the appended claims. Under some situations, acts or steps recited in the claims may be executed in an order different from that in the embodiments and still achieve desired results. In addition, the processes depicted in the drawings do not necessarily require the particular order or sequential order shown to achieve the desired results. Multi-tasking and parallel processing are also possible or may be beneficial in certain implementations.

Figure 9:
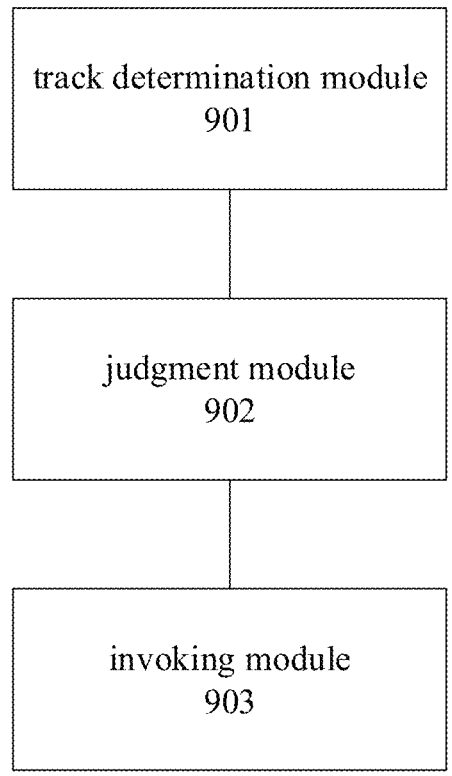
FIG. 9 is a schematic structural view of an apparatus for invoking a touch screen magnifier according to one or more embodiments of the present application.

With reference to FIG. 9, based on the same inventive concept, one or more embodiments according to the present application further provide an apparatus for invoking the touch screen magnifier, including a track determination module 901, a judgment module 902, and an invoking module 903.

The track determination module 901 is configured to determine a sliding track in response to a sliding touch instruction by a user on a touch screen;

The judgment module 902 is configured to judge whether the sliding track satisfies a recognition condition of a preset pattern; and The invoking module 903 is configured to invoke a magnifier corresponding to the preset pattern on the touch screen under a condition that the sliding track satisfies the recognition condition of the preset pattern.

As an optional embodiment, the judgment module 902 is further configured to:
  extract a set of key points according to the sliding track, wherein the set of key points includes at least five key points: a first key point, a second key point, a third key point, a fourth key point and a fifth key point, the first key point is a starting point of the sliding track, and the fifth key point is an end point of the sliding track; and
  judge whether the sliding track satisfies the recognition condition of the preset pattern based on the key points in the set of key points.

As an optional embodiment, the judgment module 902 is further configured to:
  connect the first key point to the fifth key point to determine a first judgment line segment;
  select a point with a maximum vertical distance to the first judgment line segment on the sliding track as the third key point;
  connect the first key point to the third key point to determine a second judgment line segment, and connect the third key point to the fifth key point to determine a third judgment line segment; and
  select a point with a maximum vertical distance to the second judgment line segment on the sliding track between the first key point and the third key point as the second key point; select a point with a maximum vertical distance to the third judgment line segment on the sliding track between the third key point and the fifth key point as the fourth key point.

As an optional embodiment, the preset pattern includes a first preset pattern, and the judgment module 902 is further configured to:
  connect all of the key points in the set of key points in sequence according to a sequence number from the first key point to the fifth key point to determine a key line segment between two adjacent key points in the set of key points;
  determine an angle between any two adjacent key line segments to obtain several key angles;
  judge whether all of the key angles satisfy a preset angle threshold;
  judge whether a distance between the first key point and the fifth key point is greater than a preset distance threshold under a condition that all of the key angles satisfy the preset angle threshold; and
  determine that the sliding track satisfies the recognition condition of the first preset pattern under a condition that the distance between the first key point and the fifth key point is not greater than the preset distance threshold.

As an optional embodiment, the preset pattern further includes a second preset pattern, and the judgment module 902 is further configured to:
  further judge whether lengths of all the key line segments are approximately equal within a preset error range under a condition that at least one of the key angles does not satisfy the preset angle threshold;
  judge whether the distance between the first key point and the fifth key point is greater than the preset distance threshold under a condition that the lengths of all the key line segments are approximately equal within the preset error range; and
  determine that the sliding track satisfies a recognition condition of the second preset pattern under a condition that the distance between the first key point and the fifth key point is not greater than the preset distance threshold.

As an optional embodiment, the preset pattern further includes a third preset pattern, and the judgment module 902 is further configured to:
  further judge whether at least one of the key angles is within a preset straight angle threshold range under a condition that the lengths of all the key line segments are not approximately equal within the preset error range;
  judge whether the distance between the first key point and the fifth key point is greater than the preset distance threshold under a condition that at least one of the key angles is within the preset straight angle threshold range; and
  determine that the sliding track satisfies a recognition condition of the third preset pattern under a condition that the distance between the first key point and the fifth key point is not greater than the preset distance threshold.

As an optional embodiment, the preset pattern further includes a fourth preset pattern, and the judgment module 902 is further configured to:
  under a condition that none of the key angles is within the preset straight angle threshold range, select, on each key track, a point with a maximum vertical distance to the key line segment corresponding to the key track in sequence as an auxiliary point, wherein the key track refers to a sliding track between two ends of the key line segment;
  determine a fitted elliptical track according to the key points and the auxiliary points;
  judge whether a sum of distances, each of which is between a respective point on the sliding track and the fitted elliptical track, satisfies a preset fitting threshold;
  judge whether the distance between the first key point and the fifth key point is greater than the preset distance threshold under a condition that the sum of the distances satisfies the preset fitting threshold; and
  determine that the sliding track satisfies a recognition condition of the fourth preset pattern under a condition that the distance between the first key point and the fifth key point is not greater than the preset distance threshold.

As an optional embodiment, the invoking module 903 is further configured to:
  gradually reduce a size of a first target image into a first size in response to a first touch instruction by a user, wherein the first touch instruction refers to approaching of at least two fingers of the user in a first operation region, the first operation region refers to a magnified region of the magnifier, and the first target image refers to a target image corresponding to the first operation region;
  gradually increase the size of the first target image into a second size in response to a second touch instruction by the user, wherein the second touch instruction refers to moving away of at least two fingers of the user from each other in the first operation region.

For convenience of description, the above apparatus is described according to functions divided into various modules, respectively. Of course, functions of the various modules may be implemented in one or more pieces of software and/or hardware when one or more embodiments of the present specification are implemented.

The apparatus of the above embodiments is configured to implement the corresponding method of the foregoing embodiments and has beneficial effects of the embodiments of the corresponding method, which is not described in detail herein.

Figure 10:
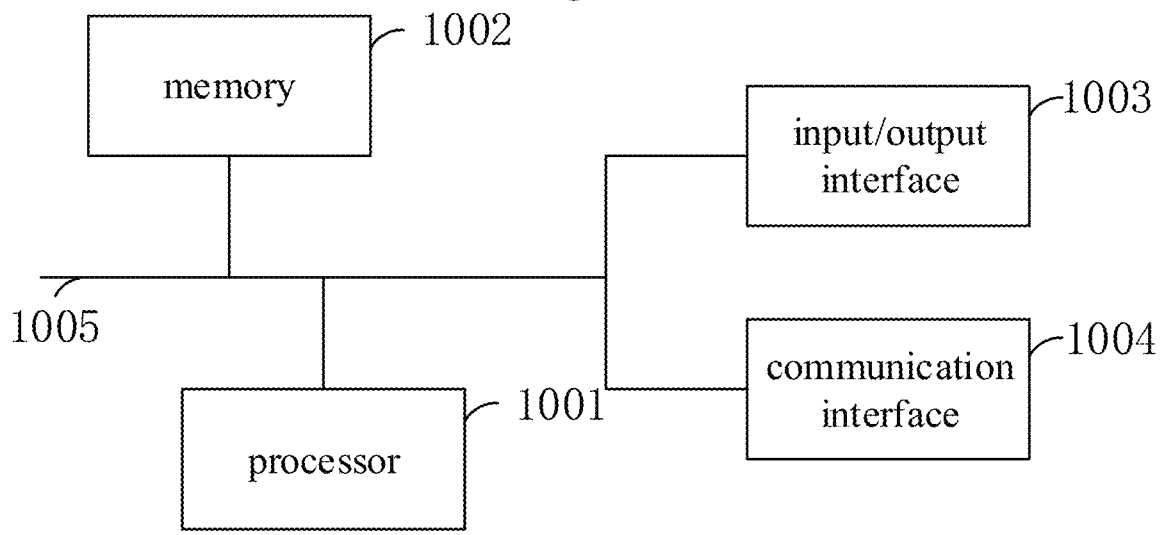
FIG. 10 is a schematic structural view of an electronic device according to one or more embodiments of the present application.

Based on the same inventive concept, one or more embodiments of the present application further provide an electronic device including a memory, a processor and a computer program stored on the memory and executable on the processor, and the processor, when executing the program, implements the method for invoking the touch screen magnifier as described in any of the above embodiments. FIG. 10 shows a relatively specific structural view of hardware of the electronic device according to this embodiment, and the device may include a processor 1001, a memory 1002, an input/output interface 1003, a communication interface 1004 and a bus 1005. The processor 1001, the memory 1002, the input/output interface 1003 and the communication interface 1004 are communicatively connected in the device to each other via the bus 1005.

The processor 1001 may be implemented by a general-purpose central processing unit (CPU), a microprocessor, an application specific integrated circuit (ASIC) or one or more integrated circuits, and be configured to execute relevant programs to implement the technical solutions according to the embodiments of the present specification.

The memory 1002 may be implemented in a form of an read only memory (ROM), a random access memory (RAM), a static storage device, a dynamic storage device and the like. The memory 1002 may store an operating system and other application programs, and when the technical solutions according to the embodiments of the present specification are implemented by software or firmware, relevant program codes are stored in the memory 1002 and are invoked and executed by the processor 1001.

The input/output interface 1003 is configured to connect the input/output modules to input and output information. The input/output/modules may be provided as a component in the device (not shown in the Fig) or may be connected to the device externally to provide a corresponding function. An input device may include a keyboard, a mouse, a touch screen, a microphone, various sensors and the like, and an output device may include a display, a speaker, a vibrator, an indicator light and the like.

The communication interface 1004 is configured to connect communication modules (not shown in the Fig) to achieve communicative interaction between the present device and other devices. The communication module may achieve communication by a wired manner (such as USB, network cable and the like) or by a wireless manner (such as mobile network, WIFI, bluetooth and the like).

Bus 1005 includes a path for communicating information among various components of the device, such as the processor 1001, the memory 1002, the input/output interface 1003, and the communication interface 1004. For example, rather than limiting, the bus 1005 may include an accelerated graphics port (AGP) or other graphics bus, an extended industry standard architecture (EISA) bus, a front side bus (FSB), a hyper transport (HT) interconnect, an industry standard architecture (ISA) bus, an infinite bandwidth interconnect, a low pin count (LPC) bus, a memory bus, a micro channel architecture (MCA) bus, a peripheral component interconnect (PCI) bus, a PCI-Express (PCI-X) bus, a serial advanced technology attachment (SATA) bus, a video electronic standard association local bus (VLB), or other suitable bus, or combinations of two or more above buses. Where appropriate, the bus 1005 may include one or more buses. Although the embodiment of the present application describes and shows a specific bus, the present application considers any suitable bus or interconnect.

It should be noted that although only the processor 1001, the memory 1002, the input/output interface 1003, the communication interface 1004 and the bus 1005 are shown for the device described above, in a specific implementation, the device may include other components necessary for normal operation. Moreover, those skilled in the art may appreciate that the device described above may further only include components necessary to implement the embodiments of the present specification, and may not necessarily include all of the components shown in the drawings.

Based on the same inventive concept, corresponding to the method of any embodiments described above, one or more embodiments of the present specification further provide a non-transitory computer-readable storage medium storing computer instructions, and the computer instructions are used to cause the computer to implement the method for invoking the touch screen magnifier as described in any of the above embodiments.

The non-transitory computer-readable storage medium of this embodiment includes a permanent medium, a non-permanent medium, a removable medium and a non-removable medium, which may store information by any method or technology. The information may be computer readable instructions, data structures, modules of a program, or other data. Examples of the computer storage medium include, but are not limited to phase random access memory (PRAM), static random access memory (SRAM), dynamic random access memory (DRAM), other types of random access memory (RAM), read only memory (ROM), electrically erasable programmable read only memory (EEPROM), flash memory or other memory technology, compact disc read only memory (CD-ROM), digital versatile disc (DVD) or other optical storage, magnetic cassettes, magnetic tape magnetic disk storage or other magnetic storage devices or any other non-transmission medium, all of which may be used to store information that may be accessed by a computing device.

The functional blocks shown in the structural block diagrams above can be implemented as hardware, software, firmware, or a combination thereof. When implemented in hardware, it can be, for example, an electronic circuit, an application specific integrated circuit (ASIC), suitable firmware, a plug-in, a functional card, and the like. When implemented as software, elements of the present application are programs or code segments used to perform required tasks. The programs or code segments can be stored in a machine-readable medium, or transmitted on a transmission medium or a communication link through a data signal carried in a carrier wave. A "machine-readable medium" can include any medium that can store or transmit information. An example of the machine-readable media includes an electronic circuit, a semiconductor memory device, a Read-Only Memory (ROM), a flash memory, an erasable ROM (EROM), a floppy disk, a CD-ROM, an optical disk, a hard disk, a fiber optic medium, a radio frequency (RF) link, and the like. The code segments can be downloaded via a computer network such as the Internet, intranet, and the like.

It should also be noted that, according to the exemplary embodiments described in the present application, some methods or systems are described based on a series of steps or apparatuses. However, the present application is not limited to the above order of the steps, that is, the steps can be executed in the order described in the embodiments or in orders different from that in the embodiments, or several steps can be executed at the same time.

Aspects of the present disclosure are described above with reference to flowchart illustrations and/or block diagrams of methods, apparatuses (systems) and computer program products according to the embodiments of the present application. It should be understood that the flowchart illustrations and/or each block of the block diagrams, and a combination of the flowchart illustrations and/or the blocks of the block diagrams can be implemented by the computer program instructions. These computer program instructions can be provided to a processor of a general purpose computer, special purpose computer, or other programmable data processing apparatus to produce a machine such that execution of the instructions via the processor of the computer or other programmable data processing apparatus enables the implementation of the functions/acts specified in the flowchart illustrations and/or one or more blocks of block diagrams. Such processor can be but is not limited to a general purpose processor, a special purpose processor, an application specific processor, or a field programmable logic circuit. It should also be understood that each block of the block diagrams and/or the flowchart illustrations, and the combination of blocks of the block diagrams and/or the flowchart illustrations can also be implemented by special purpose hardware that performs specified functions or actions, or by the combination of the special purpose hardware and computer instructions.

A person skilled in the art should appreciate that the discussion of any embodiment above is only meant to be exemplary and is not intended to imply that the scope of the disclosure (including the claims), is limited to these examples. Technological features of the above embodiments or different embodiments may further be combined within the concept of the present disclosure, the steps may be implemented in any order, and there are many other variations of different aspects of one or more of the embodiments of the present application described above, which are not provided in detail for the sake of clarity.

One or more embodiments are intended that the present application encompass all such alternatives, modifications and variations as fall within the broad scope of the appended claims. Therefore, any omissions, modifications, equivalent alternatives, and improvements that that are made in the gist and principle of one or more embodiments of the present application should be included in the protection scope of the present disclosure.

What is claimed is:

1. A method for invoking a touch screen magnifier, comprising:
   determining a sliding track in response to a sliding touch instruction by a user on a touch screen;
   judging whether the sliding track satisfies a recognition condition of a preset pattern; and
   invoking a magnifier corresponding to the preset pattern on the touch screen under a condition that the sliding track satisfies the recognition condition of the preset pattern,
   wherein judging whether the sliding track satisfies the recognition condition of the preset pattern comprises:
      extracting a set of key points according to the sliding track, wherein the set of key points comprises at least five key points: a first key point, a second key point, a third key point, a fourth key point and a fifth key point, the first key point is a starting point of the sliding track, and the fifth key point is an end point of the sliding track; and
      judging whether the sliding track satisfies the recognition condition of the preset pattern based on the key points in the set of key points,
   wherein extracting the set of key points according to the sliding track comprises:
      connecting the first key point to the fifth key point to determine a first judgment line segment;
      selecting a point with a maximum vertical distance to the first judgment line segment on the sliding track as the third key point;
      connecting the first key point to the third key point to determine a second judgment line segment, and connecting the third key point to the fifth key point to determine a third judgment line segment; and
      selecting a point with a maximum vertical distance to the second judgment line segment on the sliding track between the first key point and the third key point as the second key point selecting a point with a maximum vertical distance to the third judgment line segment on the sliding track between the third key point and the fifth key point as the fourth key point.

2. The method according to claim 1, wherein after invoking the magnifier corresponding to the preset pattern on the touch screen, the method further comprises:
   gradually reducing a size of a first target image into a first size in response to a first touch instruction by a user, wherein the first touch instruction refers to approaching of at least two fingers of the user in a first operation region, the first operation region refers to a magnified region of the magnifier, and the first target image refers to a target image corresponding to the first operation region; and
   gradually increasing the size of the first target image into a second size in response to a second touch instruction by the user, wherein the second touch instruction refers to moving away of at least two fingers of the user from each other in the first operation region.

3. An electronic device comprising a memory, a processor and a computer program stored on the memory and executable on the processor, wherein the processor, when executing the program, implements operations comprising:
   determining a sliding track in response to a sliding touch instruction by a user on a touch screen;
   judging whether the sliding track satisfies a recognition condition of a preset pattern; and
   invoking a magnifier corresponding to the preset pattern on the touch screen under a condition that the sliding track satisfies the recognition condition of the preset pattern,
   wherein judging whether the sliding track satisfies the recognition condition of the preset pattern comprises:
      extracting a set of key points according to the sliding track, wherein the set of key points comprises at least five key points: a first key point, a second key point, a third key point, a fourth key point and a fifth key point, the first key point is a starting point of the sliding track, and the fifth key point is an end point of the sliding track; and
      judging whether the sliding track satisfies the recognition condition of the preset pattern based on the key points in the set of key points,
   wherein extracting the set of key points according to the sliding track comprises:
      connecting the first key point to the fifth key point to determine a first judgment line segment;

selecting a point with a maximum vertical distance to the first judgment line segment on the sliding track as the third key point;

connecting the first key point to the third key point to determine a second judgment line segment, and connecting the third key point to the fifth key point to determine a third judgment line segment; and selecting a point with a maximum vertical distance to the second judgment line segment on the sliding track between the first key point and the third key point as the second key point selecting a point with a maximum vertical distance to the third judgment line segment on the sliding track between the third key point and the fifth key point as the fourth key point.

4. The electronic device according to claim 3, wherein the preset pattern comprises a first preset pattern, and judging whether the sliding track satisfies the recognition condition of the preset pattern based on the key points in the set of key points comprises:

connecting all of the key points in the set of key points in sequence according to a sequence number from the first key point to the fifth key point to determine a key line segment between two adjacent key points in the set of key points;

determining an angle between any two adjacent key line segments to obtain several key angles;

judging whether all of the key angles satisfy a preset angle threshold;

judging whether a distance between the first key point and the fifth key point is greater than a preset distance threshold under a condition that all of the key angles satisfy the preset angle threshold; and determining that the sliding track satisfies the recognition condition of the first preset pattern under a condition that the distance between the first key point and the fifth key point is not greater than the preset distance threshold.

5. The electronic device according to claim 4, wherein the preset pattern further comprises a second preset pattern, and after judging whether all of the key angles satisfy the preset angle threshold, the operations further comprise:

further judging whether lengths of all the key line segments are approximately equal within a preset error range under a condition that at least one of the key angles does not satisfy the preset angle threshold;

judging whether the distance between the first key point and the fifth key point is greater than the preset distance threshold under a condition that the lengths of all the key line segments are approximately equal within the preset error range; and determining that the sliding track satisfies a recognition condition of the second preset pattern under a condition that the distance between the first key point and the fifth key point is not greater than the preset distance threshold.

6. The electronic device according to claim 5, wherein the preset pattern further comprises a third preset pattern, and after judging whether the lengths of all the key line segments are approximately equal within the preset error range, the operations further comprise:

further judging whether at least one of the key angles is within a preset straight angle threshold range under a condition that the lengths of all the key line segments are not approximately equal within the preset error range;

judging whether the distance between the first key point and the fifth key point is greater than the preset distance threshold under a condition that at least one of the key angles is within the preset straight angle threshold range; and determining that the sliding track satisfies a recognition condition of the third preset pattern under a condition that the distance between the first key point and the fifth key point is not greater than the preset distance threshold.

7. The electronic device according to claim 6, wherein the preset pattern further comprises a fourth preset pattern, and after judging whether at least one of the key angles is within the preset straight angle threshold range, the operations further comprise:

under a condition that none of the key angles is within the preset straight angle threshold range, selecting, on each key track, a point with a maximum vertical distance to the key line segment corresponding to the key track in sequence as an auxiliary point, wherein the key track refers to a sliding track between two ends of the key line segment;

determining a fitted elliptical track according to the key points and the auxiliary points;

judging whether a sum of distances, each of which is between a respective point on the sliding track and the fitted elliptical track, satisfies a preset fitting threshold;

judging whether the distance between the first key point and the fifth key point is greater than the preset distance threshold under a condition that the sum of the distances satisfies the preset fitting threshold; and determining that the sliding track satisfies a recognition condition of the fourth preset pattern under a condition that the distance between the first key point and the fifth key point is not greater than the preset distance threshold.

8. The electronic device according to claim 3, wherein after invoking the magnifier corresponding to the preset pattern on the touch screen, the operations further comprise:

gradually reducing a size of a first target image into a first size in response to a first touch instruction by a user, wherein the first touch instruction refers to approaching of at least two fingers of the user in a first operation region, the first operation region refers to a magnified region of the magnifier, and the first target image refers to a target image corresponding to the first operation region; and gradually increasing the size of the first target image into a second size in response to a second touch instruction by the user, wherein the second touch instruction refers to moving away of at least two fingers of the user from each other in the first operation region.

9. The electronic device according to claim 3, wherein the operations further comprise:

invoking a magnifier corresponding to a shape of the preset pattern on the touch screen under a condition that the sliding track satisfies the recognition condition of the preset pattern.

10. A non-transitory computer-readable storage medium storing computer instructions, wherein the computer instructions, when executed by a processor, cause the processor to implement the method according to claim 1.

11. The method according to claim 1, further comprising:

invoking a magnifier corresponding to a shape of the preset pattern on the touch screen under a condition that the sliding track satisfies the recognition condition of the preset pattern.

12. The method according to claim 1, wherein the preset pattern comprises a first preset pattern, and judging whether the sliding track satisfies the recognition condition of the preset pattern based on the key points in the set of key points comprises:
- connecting all of the key points in the set of key points in sequence according to a sequence number from the first key point to the fifth key point to determine a key line segment between two adjacent key points in the set of key points;
- determining an angle between any two adjacent key line segments to obtain several key angles;
- judging whether all of the key angles satisfy a preset angle threshold;
- judging whether a distance between the first key point and the fifth key point is greater than a preset distance threshold under a condition that all of the key angles satisfy the preset angle threshold; and
- determining that the sliding track satisfies the recognition condition of the first preset pattern under a condition that the distance between the first key point and the fifth key point is not greater than the preset distance threshold.

13. The method according to claim 12, wherein the preset pattern further comprises a second preset pattern, and after judging whether all of the key angles satisfy the preset angle threshold, the method further comprises:
- further judging whether lengths of all the key line segments are approximately equal within a preset error range under a condition that at least one of the key angles does not satisfy the preset angle threshold;
- judging whether the distance between the first key point and the fifth key point is greater than the preset distance threshold under a condition that the lengths of all the key line segments are approximately equal within the preset error range; and
- determining that the sliding track satisfies a recognition condition of the second preset pattern under a condition that the distance between the first key point and the fifth key point is not greater than the preset distance threshold.

14. The method according to claim 13, wherein the preset pattern further comprises a third preset pattern, and after judging whether the lengths of all the key line segments are approximately equal within the preset error range, the method further comprises:
- further judging whether at least one of the key angles is within a preset straight angle threshold range under a condition that the lengths of all the key line segments are not approximately equal within the preset error range;
- judging whether the distance between the first key point and the fifth key point is greater than the preset distance threshold under a condition that at least one of the key angles is within the preset straight angle threshold range; and
- determining that the sliding track satisfies a recognition condition of the third preset pattern under a condition that the distance between the first key point and the fifth key point is not greater than the preset distance threshold.

15. The method according to claim 14, wherein the preset pattern further comprises a fourth preset pattern, and after judging whether at least one of the key angles is within the preset straight angle threshold range, the method further comprises:
- under a condition that none of the key angles is within the preset straight angle threshold range, selecting, on each key track, a point with a maximum vertical distance to the key line segment corresponding to the key track in sequence as an auxiliary point, wherein the key track refers to a sliding track between two ends of the key line segment;
- determining a fitted elliptical track according to the key points and the auxiliary points;
- judging whether a sum of distances, each of which is between a respective point on the sliding track and the fitted elliptical track, satisfies a preset fitting threshold;
- judging whether the distance between the first key point and the fifth key point is greater than the preset distance threshold under a condition that the sum of the distances satisfies the preset fitting threshold; and
- determining that the sliding track satisfies a recognition condition of the fourth preset pattern under a condition that the distance between the first key point and the fifth key point is not greater than the preset distance threshold.

* * * * *